United States Patent
Kreuter et al.

[11] 3,762,280
[45] Oct. 2, 1973

[54] PISTON MOTOR DEVICE

[75] Inventors: Kenneth G. Kreuter, Goshen, Ind.; Lyall O. Steger, Richmond, Va.

[73] Assignee: Robertshaw Controls Company, Richmond, Va.

[22] Filed: Feb. 16, 1972

[21] Appl. No.: 226,953

Related U.S. Application Data

[63] Continuation of Ser. No. 844,928, July 25, 1969, abandoned.

[52] U.S. Cl. .................. 92/98 D, 92/130, 92/140, 74/522

[51] Int. Cl. ..................... F01b 19/00, F01b 9/00

[58] Field of Search ............... F01b/31/00; 92/140, 92/130, 98 D, 98 R; 74/522; 251/60; 137/790

[56] References Cited
UNITED STATES PATENTS

| | | | |
|---|---|---|---|
| 1,167,714 | 1/1916 | Pfau | 74/522 |
| 2,646,074 | 7/1953 | Hopkins | 251/60 |
| 2,908,478 | 10/1959 | Starrett | 92/140 |
| 3,082,792 | 3/1963 | Jenkins | 137/790 |

*Primary Examiner*—Paul E. Maslousky
*Attorney*—Anthony A. O'Brien

[57] ABSTRACT

A piston motor device having a piston rod actuating mechanism mounted in a two-piece housing assembled with a snap fit and having a linkage assembly connected to the outer end of the piston rod for moving a shaft member clockwise and counterclockwise about its axis in response to linear movement of the piston rod.

1 Claim, 7 Drawing Figures

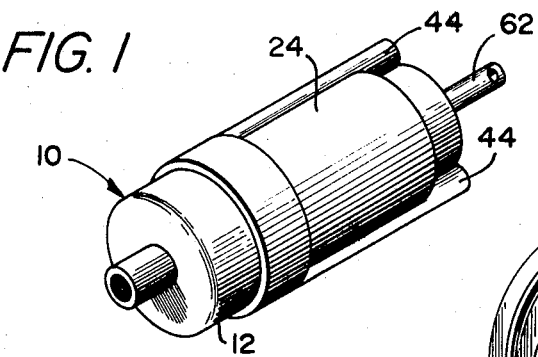
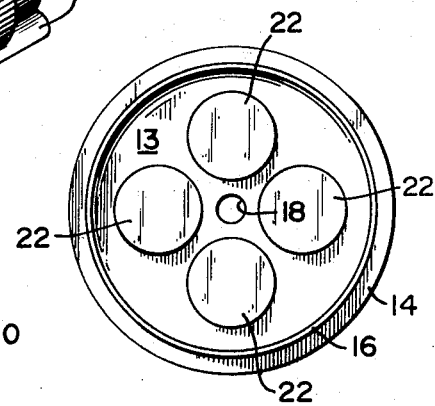
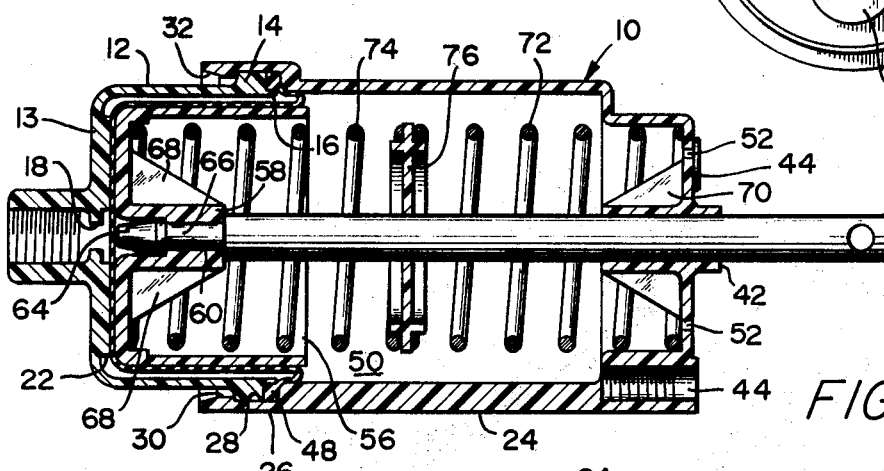
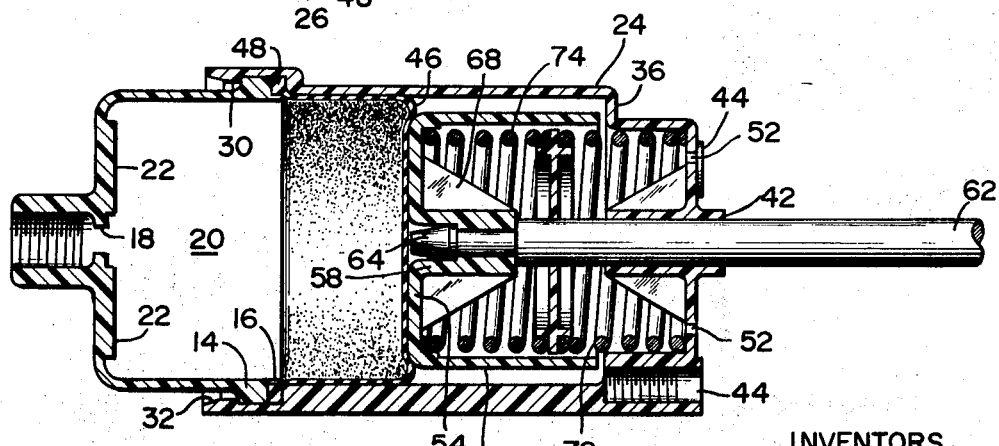
INVENTORS
KENNETH G. KREUTER
LYALL O. STEGER
BY Anthony A. O'Brien
ATTORNEY 3,762,280

PISTON MOTOR DEVICE

BACKGROUND OF THE INVENTION

This is a continuation of application Ser. No. 844,928 filed July 25, 1969, now abandoned.

1. Field of the Invention

This invention relates to a piston motor device and, more particularly, to a housing for the actuating mechanism of its piston rod having an operating linkage on its free end.

2. Description of the Prior Art

Conventional piston motor devices whether of the fluid or the electrical type have been expensive to manufacture because of the necessity for skilled labor utilizing expensive tooling; in addition, the housings for such devices have been conventionally made of metal that increases at the overall weight as well as the cost. While many linkage mechanisms have been utilized for converting the reciprocatory movement of the piston rod to an oscillatory movement of a shaft, they have likewise been expensive to manufacture and assemble because of the complexity of their link arms.

SUMMARY OF THE INVENTION

It is, therefore, an object of the present invention to construct a piston motor device from a simple and economical manner without requiring skilled labor.

Another object of the present invention is to construct the housing of a motor piston device from two molded plastic sections having a snap fit connection.

It is another object of this invention to provide a motor piston device with a linkage assembly for converting piston rod reciprocation to a shaft oscillation.

A further object of the present invention is to provide the linkage assembly between an oscillatory shaft and a reciprocating rod with an adjustment to control the angular degree of shaft oscillation.

The present invention is summarized in a motor piston device having a casing of first and second sections with a diaphragm peripherally mounted therebetween, a spring means in the casing for applying a biasing force to the diaphragm, a pressure chamber in the casing for applying a pressure force of the diaphragm in opposition to the biasing force, a piston disposed between the spring and the diaphragm and having a piston rod extending out of the casing for connection to a linkage assembly, and a mating interlocking connection between the two sections of the casing permitting the assembly with a snap fit.

Other objects and advantages of the present invention become apparent from the following description taken in conjunction with the accompanying drawings.

BRIEF DESCRIPTION OF THE DRAWINGS

FIG. 1 is an isometric view of a piston motor device embodying the present invention;

FIG. 2 is an enlarged vertical section of FIG. 1;

FIG. 3 is a cross-section similar to FIG. 2 but showing the device in another operating position;

FIG. 4 is an end view of the left part of FIG. 3 as viewed from the right thereof;

DESCRIPTION OF THE PREFERRED EMBODIMENTS

Figure 5:
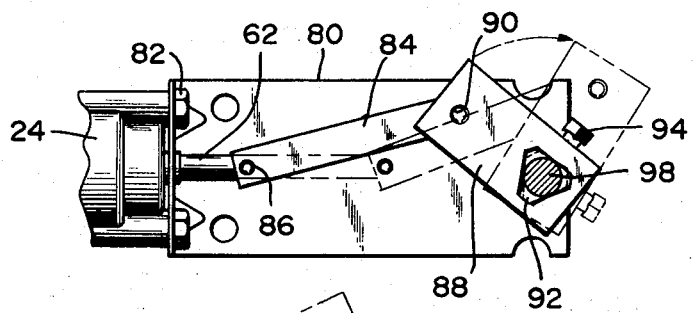
FIG. 5 is a top plan view showing a portion of the piston motor device of FIG. 1 attached to a mounting bracket and an operating linkage.

A piston motor device in accordance with the present invention is shown in FIGS. 1 and 2 as including a hollow casing 10 made of any suitable plastic material and having a pair of mating sections. The first section 12 is generally cup-shaped with an annular boss 14 on the periphery thereof adjacent to, but slightly spaced from, the lip so as to define a cylindrical tab 16. The bottom wall 13 of the cup shaped member 12 has an internally threaded boss leading to a centrally disposed port or opening 18; a pneumatic pressure chamber 20 communicates with the port 18 whereby a pneumatic signal pressure may be supplied from a pneumatic source (not shown) connected to the threaded boss. The interior of the bottom wall 13 is provided with a plurality of stop members in the form of bosses 22 radially spaced from the port 18 and circumferentially spaced from each other. The bosses 22 may be of any suitable number and shape to present a plurality of spaced flat surfaces in the bottom wall 13 of the cup shaped member 12; in this particular embodiment, four of such bosses are utilized and they are circular in outline.

The second section 24 of the casing 10 has an annular offset flange 26 forming its open lip. The interior surface of the flange 26 includes an annular recess 28 extending from its offset end to an interior shoulder 30 which leads to a tapered annular portion 32. The bottom wall of the second cup-shaped section 24 includes an inwardly directed shoulder 36 extending to an annular wall 38 leading to the bottom wall 40 of the cup shaped member 24. The center portion of such bottom wall is integrally formed with a bushing 42; in spaced parallel relation to the bushing 42 and integrally formed on the exterior of the annular wall 38, there are a plurality (three in this instance) of internally threaded cylindrical bosses 44 equally spaced from each other.

A flexible rubber diaphragm 46 of the roll type has an annular peripheral bead 48 for mounting purposes inside the casing 10. As is illustrated in FIGS. 2 and 3, the diaphragm 46 is assembled in the casing 10 by placing its peripheral bead 48 in the recess 28 of the second section 24 and then moving the first section 12 therein until its annular boss 14 is moved past the tapered portion 32 and shoulder portion 30 into the same recess 28; the lip 16 then serves to retain the peripheral bead 48 in position. The movement of annular boss 14 past the tapered and shoulder portions 32 and 30 permits assembly of the plastic molded sections 12 and 24 with a snap fit. Upon assembly the annular boss 14 slightly compresses the diaphragm bead 48 in the recess 28 so that the diaphragm bead 48 functions in the same manner as an O-ring seal whereby the pneumatic pressure chamber 20 is sealed from the atmosphere.

The diaphragm 46 defines a movable wall separating the pneumatic pressure chamber 20 in the casing section 12 from an atmospheric pressure chamber 50 in the casing section 24. The chamber 50 communicates with the atmosphere by means of spaced vent ports 52 located in the bottom wall 40. The atmospheric chamber 50 houses the mechanism which is actuated by movement of the diaphragm from FIG. 2 to FIG. 3 in response to a pneumatic pressure applied to the chamber 20. Such mechanism includes a piston made of a molded plastic in the form of a cup having a bottom wall plate 54 abutting the diaphragm 46 and an outer cylindrical wall 56, the peripheral lip of which cooperates with the interior surface of the shoulder 36 to stop or limit piston movement in the right-hand direction as viewed in FIG. 3. The piston also has a centrally located connector bushing 58, the interior of which has a through bore that is stepped to define a cylindrical wall 60. One end of a piston rod 62 has a tapered end portion 64 and a necked-down portion 66 to provide a snap fit connection with the piston connector 58 by sliding the tapered end 64 past the outer portion of the bore until the necked-down portion 66 rests in the inner portion of the bore against the cylindrical wall 60. The rod 62 and connector 58 move axially as a unit but the rod 62 is free to rotate in the connector bushing 58. A plurality (e.g. three) of flat reinforcing ribs 68 each have a shape of a triangular web and extend edgewise from the bottom wall 54 along the outer surface of the connector 58. The connector 58 is in axial alignment with the bushing 42 which is also provided with a plurality (e.g., three) of similar type reinforcing ribs 70 extending from the bottom wall 40 along the outer surface of bushing 42. A pair of coil springs 72 and 74 surround the piston rod 62 and are mounted in the chamber 50 in tandem relation to each other. A spacer washer 76 is slidably mounted on the piston rod 62 and is disposed between adjacent ends of the coil springs 72 and 74. The two coil springs define a compound spring arrangement mounted in compression between the bottom wall 40 of casing section 24 and bottom wall 54 of the piston.

The piston motor casing 10 is secured to an L-shaped mounting bracket 80, one leg of which is centrally apertured to receive the projecting end of bushing 42 so that the piston rod 62 may extend therethrough. The same leg of bracket 80 is provided with apertures aligned with the cylindrical bosses 44 which receive fastening bolts 82. The other leg of the mounting bracket 80 may have any suitable dimension appropriate for its particular installation; such leg is shown as a rectangular plate in FIG. 4 and as a square plate in FIG. 5 is provided with apertures for mounting purposes.

As is illustrated in FIG. 4 an operating linkage is attached to the outer end of the piston rod 62. A link 84 has a generally U-shaped cross-section with one end pivotally attached to the piston rod 62 by means of a roll pin 86. A crankarm 88 has a generally U-shaped cross-section and is pivotally attached to the other end of the link 84 by means of a roll pin 90. The other end of the crankarm 88 is provided with triangular cut out 92 in each of its leg members while its connecting leg is apertured to receive a locking bolt 94 that is retained in the arm 88 by a square nut 96 (FIG. 6) disposed between the two leg members so as to prevent its rotation. A shaft or rod 98 of a device to be operated extends through the aligned triangular cut outs 92 and is securely fastened to the crankarm 88 by means of a locking bolt 94.

Figure 6:
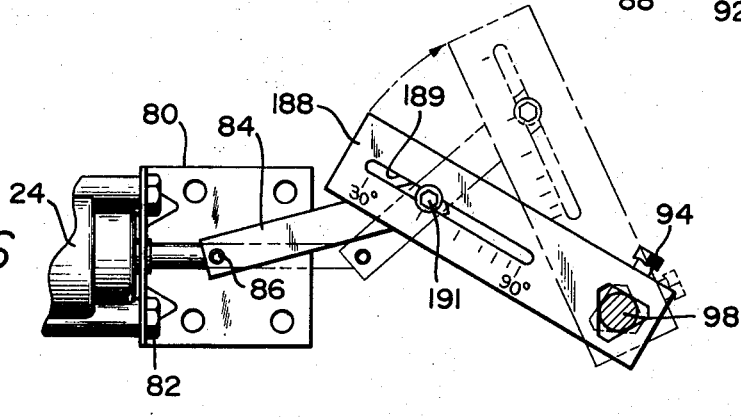
FIG. 6 is a view similar to FIG. 5 but showing a modification thereof.

In the embodiment illustrated in FIGS. 5 and 6 the operating linkage contains substantially the same structure as that described above in connection with FIG. 4 so that the same reference numerals are applicable to the similar components. The embodiment of FIGS. 5 and 6 differs from FIG. 4 with respect to the crankarm and its pivotal connection to the link 84. As is shown in FIG. 5, the outer end of link 84 has replaced the pivot pin 90 with a bushing 190 that recieves the shank of a locking nut and bolt assembly 191. The crankarm 188 is provided with an aligned longitudinal slots 189 in its two legs which receives the locking nut and bolt assembly 191 and thus provides a pivotal attachment for the outer end of the link 84. Indicia or any suitable marking located along the slot 189 defines the adjustable position for the pivotal connection with the link 84 in terms of degrees to show the limit of rotation for the shaft 98.

The shaft 98 is the actuator element for a device to be actuated, which device is not illustrated since a multitude of such devices could be utilized. For example, valves, switches, positioning mechanisms, air handling units in air conditioning and heating systems, and similar types of equipment are representative of devices that may be actuated by the piston motor device of the present invention. Thus, any type of device may be used where it is desired to move its actuator element with an oscillatory movement. While the illustrated actuated element is in the form of a round shaft 98, it may have other shapes in cross-section according to the requirements of its installation.

In the following description of the sequence of operation of the piston motor device, it is being assured that FIG. 2 and the solid lines of FIG. 5 represent the relative positions of the various components when there is no pneumatic pressure signal applied to the chamber 20, i.e., the unactuated position. It should also be noted that while the piston rod 62 is being described as being moved linearly in response to a pressure signal applied to chamber 20, such piston movement could also be effected by an electrical signal; thus, an electrical motor could be housed in the casing 10 as well as a fluid motor.

A pneumatic signal from a pneumatic controller (not shown) applies a pneumatic pressure through the port 18 to the chamber 20 which becomes pressurized and moves the diaphragm 46, piston 54-58 and piston rod 62 to the right or to its extended position against the biasing force of the compound springs 72 and 74. As is shown in FIG. 4, the bosses 22 are separated from each other and the surface area of diaphragm 46 which does not engage the bosses 22, is larger than the total surface area of the four bosses 22 so that there is no possibility of sticking or vacuum locking the diaphragm 46.

The piston rod 62 is moved longitudinally along its axis from its solid line position to its dashed line position as shown in FIG. 5. Since movement of the actuator shaft 98 in the same direction and plane is prevented by any suitable means such as journal arms of supports (not shown) on a device to be actuated, the shaft 98 is precluded from any movement except rotary movement about its axis. Accordingly, the linear movement of the piston rod 62 causes the link 84 and the crankarm 88 to be pivoted about their common roll pin 90 whereby the crankarm 88 is rotated clockwise 90° about an axis defined by the shaft 98. Since the shaft 98 is fixed by the set screw 94 to the end of the crankarm 88 the shaft 98 is likewise rotated clockwise 90° about its axis.

The piston motor device will remain in its actuated position as represented by the dashed line position of the linkage in FIG. 5 as long as the pneumatic pressure is applied to the chamber 20. Upon removal of the pneumatic pressure from chamber 20, the diaphragm 46, piston 54–58 and piston rod 62 will return from its actuated position in FIG. 3 to its unactuated position of FIG. 2 by the biasing force of the spring arrangement 72-74. At the same time, the crankarm 88 and the actuator shaft 98 will be rotated counterclockwise from the dashed line position to the solid line position of FIG. 5.

During the conversion of the reciprocation of piston rod 62 to oscillation of the actuator shaft 98 the degree of pivoting of the link 84 about the roll pin 86 is very slight but the connecting web for the U-shaped link 84 is sufficiently spaced from the piston rod 62 to permit the required pivotal movement. Since the piston rod 62 is free to rotate about its axis in the guide bushing and the connector bushing 58, the entire linkage assembly attached to the piston rod 62 by the roll pin 86, may be rotated to any desired position suitable for attachment to the actuator shaft 98. The L-shaped mounting bracket 80 may also be mounted in any of three positions relative to the casing 10 by aligning the apertures therein with different mounting bosses 44 and then fastening the assembly by means of bolt 82. The L-shaped bracket 80 may also be mounted such that it will extend with its long leg underneath or parallel to the casing 10 by merely reversing the bracket 80 from its position shown in FIG. 5. The three mounting bosses 44 shown on the second section 24 of the casing 10 are located on the exterior of the section 24 so as not to interfere with the operating mechanism in the interior of the casing section 24; similarly, the three mounting bosses 44 could be located on the exterior of the casing section 12 so as to provide additional mounting possibilities of the piston motor devices.

Figure 7:
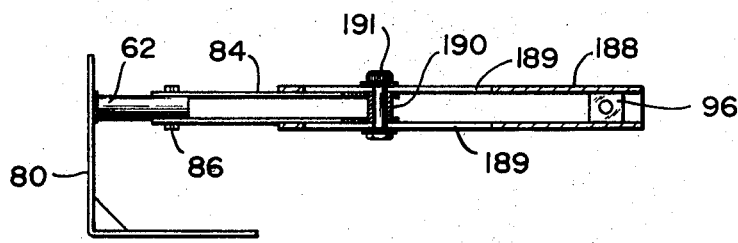
FIG. 7 is a side elevation view of the bracket and linkage of FIG. 6 with parts in section.

The linkage assembly illustrated in FIG. 5 provides angular rotation of the shaft 98 through an arc of 90°. However, certain installations may require that the limits of rotation of the shaft 98 be limited to some other angle of oscillation and such an arrangement is illustrated in the embodiment of FIGS. 6 and 7. For example, in FIG. 6 the position of the bushing 190 in the slot 189 determines the degree of movement permitted the shaft 98 with respect to rotation about its axis.

As is illustrated in FIG. 6 the bushing 190 is locked in the slot 189 at an indicia marking corresponding to approximately 40°. With such an arrangement the shaft 98 will oscillate approximately 40° in each direction of rotation in response to the reciprocation of the piston rod 62. The embodiment of FIG. 6 provides a universal crankarm 88 since the adjustment can be made for 90° of rotation to correspond to the embodiment of FIG. 5 and can be also adjusted to any intermediate position between 30° and 90° in accordance with the requirements of the device to be actuated. The sequence of operation of the embodiment illustrated in FIGS. 6 and 7 is the same as that described above with respect to the linkage assembly of FIG. 5.

The piston motor device described above has the particular advantage of a substantial reduction in cost over conventional devices since the casing and the piston element are made of plastic and since the two sections of the casing are made of plastic and since the two sections of the casing are assembled by an interlocking connection between adjacent ends which also provides a mounting for the peripheral portion of the diaphragm. The assembly is of such a simple nature that no tools are needed and the use of skilled labor is not necessary. In addition, the pivotal connections provided by the linkage assembly permit the device to be mounted practically in any position and in any degree of orientation.

In accordance with the present invention, the piston rod 62 may be moved from its unactuated to its actuated position with a positive action so that the actuator shaft 98 is rotated completely through its 90° (FIG. 5) motion by applying the full pneumatic pressure signal to the chamber 20. In addition, there may be times when a gradual action is desired resulting in a modulation movement of the piston rod 62 and a corresponding actuator shaft 98; for such gradual action, it is only necessary that the chamber 20 be provided with a gradual buildup of pressure in the chamber 20 such as would be applied from a modulating pneumatic controller. In the case of an electrical piston motor device, the initiating electrical signal could also be one of modulation by use of any suitable electrical device such as a capacitor or a potentiometer.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A piston motor device including a casing,
   means for rigidly mounting said casing,
   a piston rod having an inner end in said casing and an outer end slidably extending out of said casing,
   an operating mechanism in said casing connected to said inner end for reciprocating said piston rod,
   an actuator shaft adapted for limited clockwise and counterclockwise rotation about its axis in an oscillatory manner,
   a linkage assembly including a crankarm and a link disposed in angular relation to each other,
   said operating mechanism including a spring biased piston, a flexible diaphragm having a peripheral mounting portion carried by said casing and a central portion engaging said piston and a rotatable connection between the inner end of said piston rod and said piston permitting the linkage assembly and said piston rod to be rotated as a unit to any desired position for suitable attachment to said actuator shaft,
   said crankarm having one end directly fixed to said actuator shaft for movement thereof,
   said link having one end pivotally connected to the outer end of said piston rod for movement thereby,
   said link being supported only by the ends thereof, and
   a pivotal connection between the other end of said link and a point located along the length of said crankarm whereby reciprocation of said piston rod causes oscillation of said actuator element,
   said crankarm and said link being disposed at an obtuse angle to each other when said piston rod is at one end of its stroke and said angle being reduced in degrees when said piston rod is moved to the other end of its stroke,
   said pivotal connection including adjustment means connecting said other end of said link to a selected position along said crankarm whereby said obtuse angle therebetween may be preset to correspond to a selected oscillation limit of said actuator shaft, and
   said adjustment means including an elongated slot in said crankarm, a bushing in said other end of said link, and locking means locking said bushing in a selected position of said slot.

* * * * *